United States Patent [19]

Ito et al.

[11] Patent Number: 4,650,335
[45] Date of Patent: Mar. 17, 1987

[54] COMPARISON TYPE DIMENSION MEASURING METHOD AND APPARATUS USING A LASER BEAM IN A MICROSCOPE SYSTEM

[75] Inventors: Tokuhisa Ito; Goro Kitamura; Hidenori Horiuchi; Masaaki Aoyama, all of Tokyo, Japan

[73] Assignee: Asahi Kogaku Kogyo Kabushiki Kaisha, Tokyo, Japan

[21] Appl. No.: 556,666

[22] Filed: Nov. 30, 1983

[30] Foreign Application Priority Data

Nov. 30, 1982 [JP] Japan .................................. 57-210216

[51] Int. Cl.$^4$ .............................................. G01B 11/00
[52] U.S. Cl. ..................................... 356/398; 356/369
[58] Field of Search ............... 356/383, 384, 387, 398, 356/364, 369

[56] References Cited

U.S. PATENT DOCUMENTS 3,909,602  9/1975  Micka .................................. 356/398
4,373,817  2/1983  Coates ................................. 356/387

FOREIGN PATENT DOCUMENTS 0146005  11/1980  Japan ................................... 356/384
0026205   2/1983  Japan ................................... 356/387

Primary Examiner—R. A. Rosenberger
Assistant Examiner—Crystal D. Cooper
Attorney, Agent, or Firm—Sughrue, Mion, Zinn, Macpeak, and Seas

[57] ABSTRACT

A comparison-type dimension measurement system in which a laser 1 provides linearly polarized light that is directed by a polarization beam splitter 5 into a microscope system in which a specimen 13 is mounted. The reflected polarized light is rotated 90° by a quarter wave plate 9 and passes through the beam splitter to a multi-element line sensor 19. The laser light is scanned by a rotatable mirror 3 over the specimen. Threshold intensities are determined on indicia of known separation on a reference specimen and used to calibrate the distance measured by the line sensor.

5 Claims, 4 Drawing Figures

COMPARISON TYPE DIMENSION MEASURING METHOD AND APPARATUS USING A LASER BEAM IN A MICROSCOPE SYSTEM

BACKGROUND OF THE INVENTION

This invention relates to a comparison type dimension measuring method using a laser beam in a microscope system in which the dimensions of a fine pattern such as an IC pattern which has concave and convex parts are measured through comparison with reference dimensions, and to an apparatus for practicing the method.

Heretofore, an absolute measurement method or a comparison measurement method has been employed to measure the dimension between the edges of a concave or convex part of a fine pattern. In the absolute measurement method, a microscope system and a stage on which a specimen is mounted are moved relative to each other in two dimensions. The microscope provides a laser beam so that the edges of the concave or convex part are detected from the laser beam reflected from the part. The movement of the stage with respect to the microscope system, i.e., the distance between the edges of the concave or convex part, is measured by a high-accuracy dimension measuring unit such as a laser interference distance measuring unit.

In the absolute measurement method, the resultant measurement is sufficiently high in accuracy if the distance measuring unit used is high in accuracy. However, the method requires an expensive absolute scale such as the above-described laser interference distance measuring unit, and therefore it is unavoidable that an apparatus for practicing the method is very expensive to manufacture.

On the other hand, a comparison type dimension measuring unit is relatively inexpensive. However, it lacks sufficiently high measurement accuracy. For instance a method is known in the art in which an image enlarged by a microscope system is subjected to optical image slit scanning to effect the measurement. In another method, the enlarged image is applied to a television camera so that it is converted to a video signal for measurement. In the case when the pattern of an IC wafer or the like is imaged, the resultant optical image is low in contrast. Accordingly, in this case, it is difficult for the two methods to obtain photoelectric signals with a high S/N ratio. If an image pickup tube is employed for the television camera, the measurement accuracy is lowered by the image distortion which is inherent with this tube. In the case of a solid state camera using two-dimensional CCD's, the image distortion can be prevented, but it is impossible to perform highly accurate measurement because of the low measurement resolution.

SUMMARY OF THE INVENTION

Accordingly, an object of this invention is to provide a comparison type dimension measuring method in which the abovedescribed drawbacks have been eliminated and to provide an apparatus for practicing the method.

According to the invention, a linearly polarized laser beam is applied through a microscope system to illuminate and scan a specimen. The optically enlarged intensity distribution of the laser beam reflected from the specimen back through the microscope is compared with that which is observed when the laser beam is applied to a reference specimen in the same manner. Thereby a length of a concave or convex part of the surface of the specimen is measured.

DETAILED DESCRIPTION OF THE PREFERRED EMBODIMENTS

This invention will be described with reference to its preferred embodiment shown in the accompanying drawings.

Figure 1:
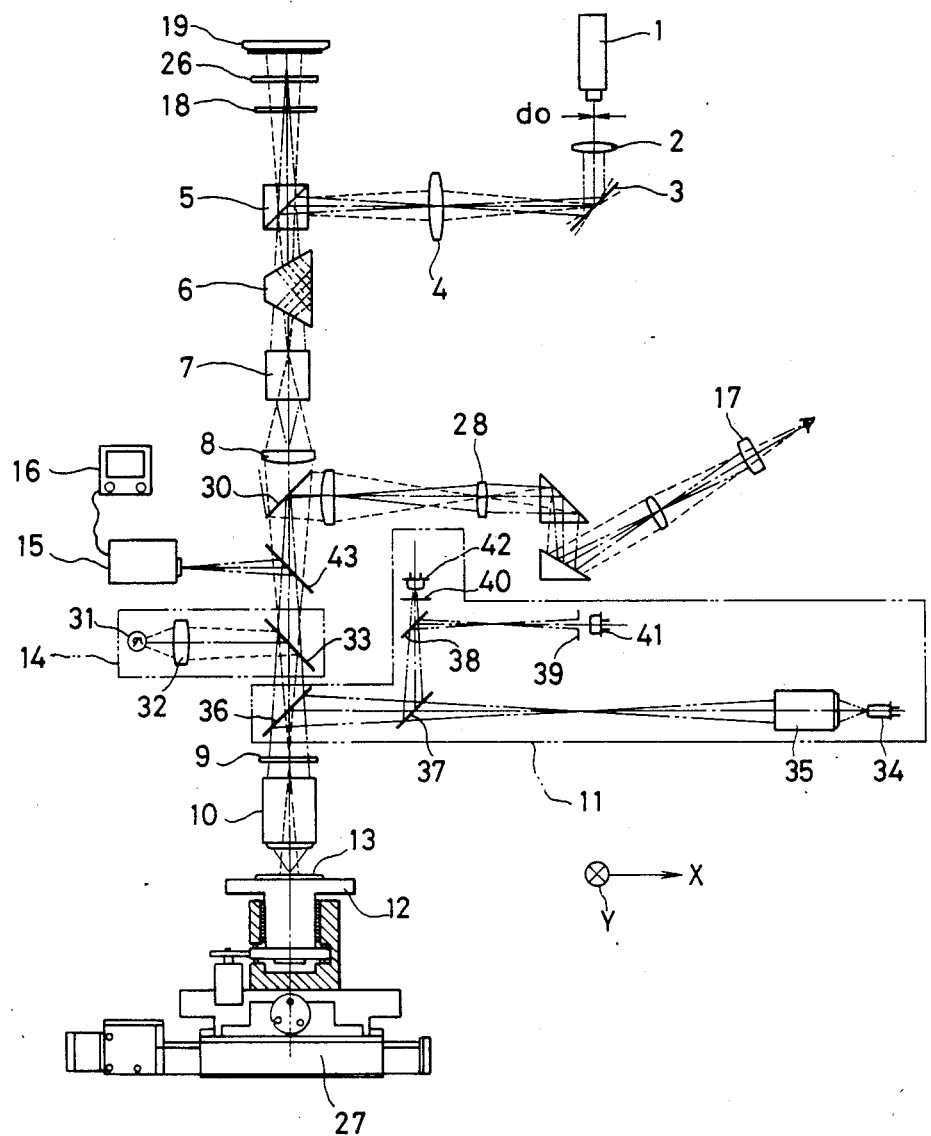
FIG. 1 is an explanatory diagram illustrating an apparatus for practicing a comparison type dimension measuring method according to this invention.

FIG. 1 shows a microscope system equipped with a comparison type dimension measuring apparatus using a laser beam according to the invention. The microscope system comprises an objective 10, a half-mirror 30 and an eyepiece 17. The microscope system further comprises a relay lens 28 which makes it possible to position the eyepiece 17 apart from a specimen 13 on a stage 12. The employment of the relay lens allows the microscope system to have a dust-proof structure which is essential in the integrated circuit industry. An illuminating system 14 is provided to illuminate the specimen 13 which is an opaque material such as a silicon wafer. Light from a light source 31 is applied through a condenser 32 and a half-mirror 33 to the microscope system. In FIG. 1, reference numeral 11 designates a focus detecting system for automatic focusing. A light beam from an infrared LED 34 is applied through a condenser 35 and a dichroic mirror 36 to the microscope system. The light beam reflected from the specimen 13 is applied through infrared half-mirrors 37 and 38 and pin holes 39 and 40 to light receiving elements 41 and 42, respectively. A focusing position is detected from the difference between the outputs of the light receiving elements, so that the stage 12 is moved vertically to the focusing position. The pin holes 39 and 40 are positioned, respectively, before and after the conjugate image point of the correct focal point of the respective beams. The microscope system is monitored by a monitoring television set 16 with a television camera 15 which images the specimen 13 through a half-mirror 43.

The comparison type dimension measuring apparatus of the invention is arranged above the above-described microscope system. A quarter (¼) wave plate 9 which is one component of the comparison type dimension measuring apparatus is disposed immediately above the microscope objective 10. The apparatus comprises a condenser 8, a low magnification objective 7, an image inverter 6, a polarization beam splitter 5, a cylindrical lens 18, a polarizing plate 26 and a line sensor 19 which are arranged on the optical axis of the microscope system from below in the stated order. The apparatus further comprises a condenser 4, an electrically rotatable mirror 3, a focusing lens 2 and a linearly polarized HeNe laser 1 which are arranged on the second optical axis of the polarization beam splitter 5.

The HeNe laser 1 is such that the output is about 1 mW, the oscillation is of the $TEM_{oo}$ mode, and a Gaussian density distribution is held in the beam so that the beam diameter is $1/e^2$ of the Gaussian distribution. The laser beam is applied to the lens 2, which forms an optical spot on the condenser 4 which is positioned on the conjugate image plane of the line sensor. The rotatable mirror 3 is swung (about the point 0) so that the condenser 4 and accordingly the specimen 13 are scanned with the laser beam. Thus, the rotatable mirror 3 plays a most important role in the invention. The condenser 4 serves to form the image of the rotatable mirror 3 on the entrance pupil of the low magnification objective 7.

The polarization beam splitter 5 is high in reflection factor with respect to the s-polarized component of a laser beam and high in transmission factor with respect to the p-polarized component of the laser beam. The laser 1 is so arranged that the s-polarized component is applied to the beam splitter.

The image inverter 6 is rotated, to permit measurement along the X and Y directions on the stage 12. In general, in the case of IC patterns or the like, the specimen 13 is arranged in the X or Y direction. Therefore, the apparatus of the invention is to perform measurement in the two directions, Since the rotatable mirror 3 swings in the same direction as that in which the line sensor 19 receives light, the image rotator 6 is turned through 45° thereby to rotate the transmitted light beam through 90°, which makes it possible to conduct scanning in the X and Y directions.

The low magnification objective 7 and the high magnification objective 10, in combination, increase both the total magnification and the resolution of the line sensor 19. The condenser 8 operates to form the image of the exit pupil of the low magnification objective 7 on the entrance pupil of the objective 10.

The laser beam from the laser 1 is directed, as the s-polarized light, to the polarization beam splitter 5 while being deflected by the rotatable mirror 3. The laser beam thus directed is reflected by the beam splitter 5 and enters the microscope system. Then, the laser beam propagates through the quarter-wave plate 9 and the objective 10 to the specimen 13. The laser beam is then reflected by the specimen 13 and returns to the polarization beam splitter 5 backward along the incident light path. As the laser beam propagates as described above, it passes through the quarter-wave plate 9 twice. Therefore, the s-polarized laser beam is p-polarized when it returns to the polarization beam splitter 5. Accordingly, it passes through the beam splitter 5 with a high transmission factor to reach the line sensor 19.

The beam splitter 5 together with the quarter-wave plate 9 reduces the loss of energy and eliminates a ghost image which otherwise may be formed by reflected light. That is, the light which is reflected by the lens 7 or 8 (before reaching the specimen 13) is s-polarized, and therefore it is reflected by the beam splitter 5 and will not reach the line sensor 19 since the polarizing plate 26 passes only p-polarized light. The cylindrical lens 18 enlarges the beam spot formed on the line sensor in a direction perpendicular to the direction of arrangement of the line sensor 19, to ease the alignment requirements of scan of the rotatable mirror 3, and to the position and orientation of the line sensor 19.

The stage 12 can be moved in the X and Y directions by an X-Y stage 27 in order to scan different parts of the specimen 13.

In the apparatus thus constructed, the rotatable mirror 3 is swung to cause the linearly polarized laser beam to scan the specimen, from which scanning the line sensor 19 provides an output distribution corresponding to the unevenness of the specimen. This output distribution is nothing more than the reflection intensity distribution of the laser beam. Therefore, the length of the concave or convex part of the specimen 13 can be measured by comparing the output distribution with a reference output distribution which is obtained when the laser beam is applied to a reference specimen used as specimen 13 in the same manner.

Figure 2:
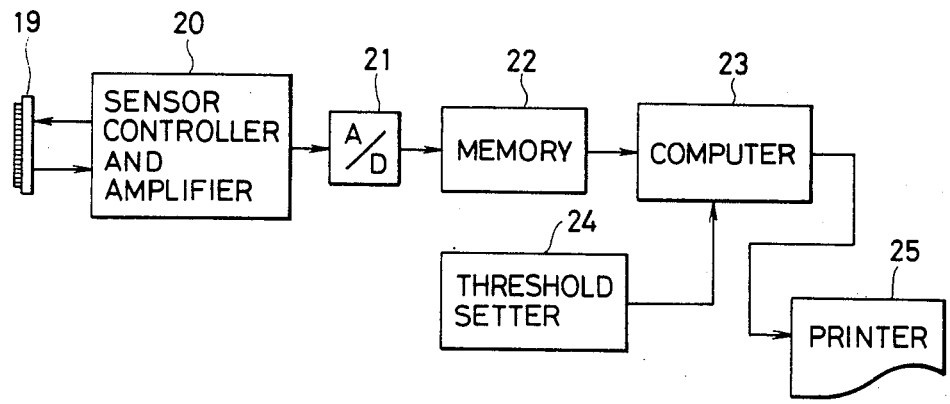
FIG. 2 is a block diagram showing one example of a system for processing the output signal of a line sensor in FIG. 1.
Figure 3:
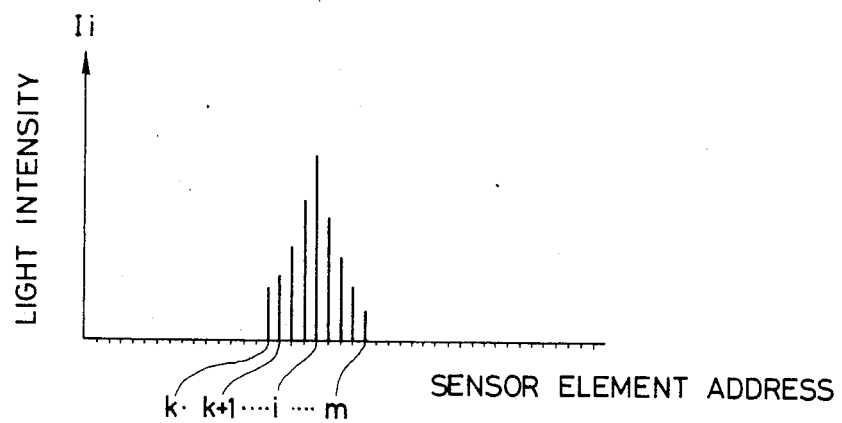
FIG. 3 is a graphical representation showing the output of a line sensor controller and amplifier.

The output of the line sensor 1 and a method of processing the output will be specifically described with reference to FIGS. 2, 3 and 4. FIG. 2 is a block diagram showing a method of controlling the output of the line sensor 19. It is assumed that the rotatable mirror 3 is swung to cause the laser beam to scan the specimen 13. In this case, the distribution of the outputs of the line sensor 19 which have been amplified by an amplifier circuit is for instance as shown in FIG. 3. That is, in the distribution the height changes (decreases) at the edge of a concave or convex part of the specimen as the position (sensor element number or address) changes. It is assumed that outputs are provided for addresses k to m with a bit or element address of the line sensor 19 represented by i. The line sensor 19 is controlled by a sensor controller and amplifier 20 which also multiplexes the intensities read by the individual elements of the sensor 19 onto an output line. The output of the sensor controller and amplifier 20 is converted into digital intensity data $I_i$ by a high-speed A/D converter 21, which is then stored in a memory 22. A computer 23 reads the addresses and outputs from the memory 22 and performs the following calculations:

$$I_{total} = \sum_{i=k}^{m} I_i \quad (1)$$

$$X_G = \frac{\sum_{i=k}^{m} I_i \cdot i}{I_{total}} \quad (2)$$

In expression (1), $I_{total}$ is the integration of the instantaneous outputs; and in expression (2) $X_G$ is the location or (possibly fractional) address of the center of gravity of the distribution.

When the pitch P of the line sensor 19 is 25 μm, the magnification $m_1$ of the high magnification objective is ×100, and the magnification $m_2$ of the low magnification object is ×5, the resolution R of the line sensor 19 is then:

$$R = P/m_1 m_2 = 0.05 \text{ μm} \quad (3)$$

Therefore, if the calculation of expression (2) is valid to one decimal place, then the resolution is improved to one-tenth (1/10) of the result of the expression (3), i.e., it is finally improved to 0.005 μm under the same conditions.

Figure 4:
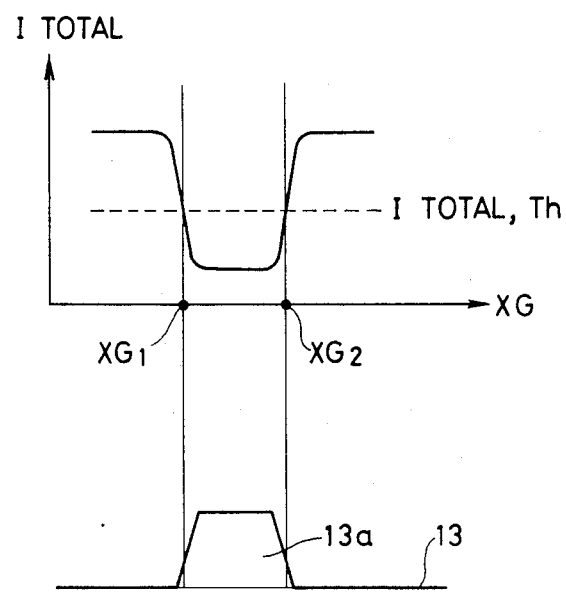
FIG. 4 is a graphical representation showing the $I_{total} - X_G$ characteristic curve varying with the unevenness of a specimen.

The data $I_{total}$ and $X_G$, which are obtained by calculating expressions (1) and (2), can be graphed as shown in FIG. 4. More specifically, FIG. 4 is a graph which is obtained when a concave part 13a of the specimen 13 is scanned. In FIG. 4, reference $I_{total,Th}$ designates a threshold value which is determined as follows: A reference specimen having a well-defined reference dimension is measured in the same manner as described above, and the threshold value is so determined from the result of the measurement that the distance $X_{G1}$-$X_{G2}$ is in agreement with the reference dimension between well-marked indicia on the reference specimen. The threshold value is set by an external setting unit 24. Therefore, if two coordinates of outputs $I_{total}$ are equal to the threshold level $I_{total,Th}$, then the difference between these coordinates is obtained which is the length of a convex part 13a. That is, if the coordinates are represented by $X_{G1}$ and $X_{G2}$, then the length X of the convex part 13a is:

$$\Delta X = X_{G1} - X_{G2}$$

When the length $\Delta X$ is multiplied by the resolution R of expression (3), an absolute scale dimension X' is obtained.

$$\Delta X' = R \cdot \Delta X$$

When this is outputted to a printer 25, the length of the convex part 13a is obtained.

Strictly stated, the coordinates $X_{G1}$ and $X_{G2}$ at the threshold level $I_{total,Th}$ are obtained by interpolation; however, they may be replaced by those $X_{G1}$ and $X_{G2}$ with sufficiently high accuracy which are closest to the threshold level $I_{total,Th}$.

The above-described apparatus is suitable for practicing the method of the invention. However, the apparatus may be so modified that the laser beam is swung by other means, for example by swinging the laser 1 itself. The reflected laser beam may also be measured by means other than that which has been described above.

In summary, in the comparison type dimension measuring method using the laser beam and the apparatus for practicing the method, the laser beam directed to the microscope system is swung to scan the specimen, and the laser beam reflected from the specimen is measured, so that the unevenness of the specimen is measured through comparison. Therefore, it is unnecessary for the apparatus to incorporate an expensive absolute scale such as a laser interference type dimension measuring unit, and accordingly the apparatus can be manufactured at low cost. Accordingly, if an IC factory uses a number of comparison type dimension measuring apparatuses together with one absolute scale, then the cost required for all the dimension measuring apparatuses in the factory can be greatly reduced. As the invention utilizes the reflected laser beam, the output signal has a very high S/N ratio, and the combination of the high magnification of the microscope system and the line sensor provide relative measurement with high accuracy. Therefore, if calibration is suitably carried out, the operation of the apparatus is equivalent to that of an absolute dimension measuring unit can be sufficiently expected.

We claim:

1. A comparison type measuring system for measuring a dimension of a test specimen relative to a reference specimen, comprising:
   a light source for producing a linearly polarized light beam;
   a microscope including a mount (13) for either of said specimens;
   means for directing said polarized beam through said microscope onto said mounted specimen;
   means for scanning said polarized beam over said mounted specimen;
   means for detecting light reflected from said mounted specimen by said scanned beam, said detecting means including a line sensor of a plurality of photo-sensitive elements;
   means for calculating an angular intensity distribution of said light reflected from said mounted specimen from outputs of said detecting means, said angular distribution calculating means comprising means for calculating a center of gravity of said angular intensity distribution;
   means for comparing said angular intensity distribution calculated by said angular distribution calculating means with an angular intensity distribution of said mounted reference specimen for measuring said test specimen dimension.

2. A dimension measuring system, as recited in claim 1, wherein said scanning means comprises a rotatable mirror.

3. A dimension measuring system, as recited in claim 1, wherein said directing means comprises:
   a polarization beam splitter (5) onto one face of which said polarized beam is directed and aligned with another face of which is the photosensitive part of said detecting means;
   a quarter-wave plate (9) disposed between said beam splitter and said mounted specimen.

4. A dimension measuring system, as recited in claim 1, wherein said comparing means comprises threshold setting means for determining a threshold level of intensity corresponding to indicia on said mounted reference specimen.

5. A dimension measuring system, as recited in claim 4, wherein said comparing means compares an intensity detected from said mounted test specimen with said threshold level.

* * * * *